US012289706B2

United States Patent
Wang

(10) Patent No.: US 12,289,706 B2
(45) Date of Patent: Apr. 29, 2025

(54) POSITIONING METHOD AND APPARATUS

(71) Applicant: HUAWEI TECHNOLOGIES CO., LTD., Guangdong (CN)

(72) Inventor: Yi Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 257 days.

(21) Appl. No.: 17/486,703

(22) Filed: Sep. 27, 2021

(65) Prior Publication Data

US 2022/0015060 A1 Jan. 13, 2022

Related U.S. Application Data

(63) Continuation of application No. PCT/CN2020/076737, filed on Feb. 26, 2020.

(30) Foreign Application Priority Data

Mar. 28, 2019 (CN) .......................... 201910245452.9

(51) Int. Cl.
*H04W 64/00* (2009.01)
*H04B 17/318* (2015.01)
*H04W 8/24* (2009.01)

(52) U.S. Cl.
CPC ........ *H04W 64/006* (2013.01); *H04B 17/318* (2015.01); *H04W 8/24* (2013.01)

(58) Field of Classification Search
CPC .................................................. H04W 64/006
See application file for complete search history.

(56) References Cited

U.S. PATENT DOCUMENTS

| 10,517,061 B1* | 12/2019 | Kumar | ................ | H04W 24/08 |
| 2011/0110338 A1* | 5/2011 | Khoryaev | ............. | G01S 5/0215 |
| | | | | 370/335 |

(Continued)

FOREIGN PATENT DOCUMENTS

| CN | 104854931 A | 8/2015 |
| CN | 107211451 A | 9/2017 |

(Continued)

OTHER PUBLICATIONS

Huawei HiSilicon, "3GPP TSG-RAN WG2 Meeting #105 R2-1901283", Considerations on Angle-based positioning technique in NR Feb. 15, 2019 total 4 pages.

(Continued)

*Primary Examiner* — Wen W Huang

(57) ABSTRACT

This application provides a positioning method and an apparatus. The method includes: A location management device provides assistance information for a terminal device, where the assistance information includes information about one or more cells used for positioning of the terminal device and reference signal configuration information of each of the one or more cells. The location management device provides a first request message for the terminal device, where the first request message includes measurement reporting configuration information. The location management device receives a reference signal measurement result of each of the one or more cells from the terminal device, where the reference signal measurement result is obtained based on the measurement reporting configuration information. The location management device obtains a DAOD of the terminal device relative to each of the one or more cells based on the reference signal measurement result.

20 Claims, 6 Drawing Sheets

(56) References Cited

U.S. PATENT DOCUMENTS

| | | | | |
|---|---|---|---|---|
| 2012/0256726 | A1* | 10/2012 | Honkanen | G01S 3/48 |
| | | | | 340/10.1 |
| 2014/0176366 | A1 | 6/2014 | Fischer et al. | |
| 2017/0359794 | A1 | 12/2017 | Fischer | |
| 2019/0215220 | A1* | 7/2019 | Islam | H04W 74/085 |
| 2020/0092737 | A1* | 3/2020 | Siomina | H04W 36/08 |
| 2021/0368468 | A1* | 11/2021 | Xing | H04W 64/00 |

FOREIGN PATENT DOCUMENTS

| | | |
|---|---|---|
| CN | 107660343 A | 2/2018 |
| CN | 108809369 A | 11/2018 |
| WO | 2015199392 A1 | 12/2015 |

OTHER PUBLICATIONS

3GPP TS 38.214 V15.5.0 (Mar. 2019), 3rd Generation Partnership Project; Technical Specification Group Radio Access Network; NR; Physical layer procedures for data(Release 15), 103 pages.
3GPP TS 38.305 V15.2.0 (Dec. 2018), 3rd Generation Partnership Project; Technical Specification Group Radio Access Network; NG Radio Access Network (NG-RAN); Stage 2 functional specification of User Equipment (UE) positioning in NG-RAN(Release 15), 69 pages.
Qualcomm Incorporated , "3GPP TSG-RAN WG2 Meeting #105 R2-1901371", Combined Downlink and Uplink NR Positioning Procedures, Feb. 15, 2019, total 9 pages.
3GPP TSG RAN WG1 Meeting #95, R1-1812236, Potential techniques for NR positioning, Huawei, HiSilicon, total 7 pages.
Huawei HiSilicon , "3GPP TSG RAN WG1 Meeting #94 R1-1809348", Considerations on NR Positioning Aug. 11, 2018,total 9 pages.
Intel Corporation , "3GPP TSG RAN WG1 Ad-Hoc Meeting 1901 R1-1900512", Analysis of Techniques for NR DL Positioning Jan. 12, 2019, total 25 pages.
Intel Corporation, Summary for NR-Positioning AI—7.2.10.1.1 DL only based Positioning. 3GPP TSG RAN WG1 Ad Hoc Meeting #1901, Taipei, Jan. 21-25, 2019, R1-1901341, 4 pages.
Fraunhofer IIS, Fraunhofer HHI, DL positioning considerations: Pattern Learning, RSS fingerprinting and Beams. 3GPP TSG RAN WG1 Meeting AH 1901, Taipei, Taiwan, Jan. 21-25, 2019, R1-1901182, 10 pages.
3GPP TSG-RAN WG2 Meeting #104 R2-1817902,On Demand Transmission of PRS for NR,Qualcomm Incorporated, Spokane, USA, Nov. 12-16, 2018, total 27 pages.

* cited by examiner

POSITIONING METHOD AND APPARATUS

CROSS-REFERENCE TO RELATED APPLICATIONS

This application a continuation of International Application No. PCT/CN2020/076737, filed on Feb. 26, 2020, which claims priority to Chinese Patent Application No. 201910245452.9, filed on Mar. 28, 2019. The disclosures of the aforementioned applications are hereby incorporated by reference in their entireties.

TECHNICAL FIELD

This application relates to the communication field, and specifically, to a positioning method and an apparatus.

BACKGROUND

A downlink angle of departure (DAOD) is defined as an electromagnetic wave departure direction observed from a network device during downlink electromagnetic wave transmission between the network device and a terminal device. In line of sight (LOS) communication, the DAOD corresponds to direction information of relative geographical positions of the network device and the terminal device. Therefore, positioning of the terminal device may be implemented based on the DAOD. For example, positioning of the terminal device is implemented based on DAODs between the terminal device and each of at least two network devices.

DAOD measurement may be implemented in the following procedure: The network device (for example, a base station) sends a plurality of reference signals that are in different beam directions to the terminal device. The terminal device receives and measures received powers of the plurality of reference signals. The DAOD between the network device and the terminal device may be determined based on a ratio relationship between the measured received powers of the reference signals that are in different beam directions and a beam direction corresponding to each sent signal.

Currently, there is no solution for reference signal configuration and measurement reporting configuration in DAOD positioning.

SUMMARY

This application provides a positioning method and an apparatus, to implement reference signal configuration and measurement reporting configuration that are applicable to DAOD measurement.

According to a first aspect, a positioning method is provided. The method includes: A location management device provides assistance information for a terminal device, where the assistance information includes information about one or more cells used for positioning of the terminal device and reference signal configuration information of each of the one or more cells. The location management device provides a first request message for the terminal device, where the first request message includes measurement reporting configuration information. The location management device receives a reference signal measurement result of each of the one or more cells from the terminal device, where the reference signal measurement result is obtained based on the measurement reporting configuration information. The location management device obtains a DAOD of the terminal device relative to each of the one or more cells based on the reference signal measurement result.

In this application, the location management device interacts with the terminal device to implement reference signal configuration and measurement reporting configuration that are used for DAOD positioning. Therefore, in this application, a cell used for positioning of the terminal device is not limited to an intra-frequency cell, that is, inter-frequency positioning may be supported. In addition, when the cell used for positioning of the terminal device is a neighboring cell, a reference signal cannot be an SSB for the neighboring cell in an existing configuration framework. This is not limited in this application. Therefore, compared with a conventional technology, this application provides a solution for configuring the reference signal configuration information and the measurement reporting configuration information that are relatively suitable for DAOD positioning.

The reference signal configuration information includes any one or more of the following information of a reference signal: time domain resource information, frequency domain resource information, and sequence information.

The reference signal includes any one of the following: a channel state information reference signal (CSI-RS), a positioning reference signal (PRS), or a synchronization signal/physical broadcast channel block (SS/PBCH block). The synchronization signal/physical layer broadcast channel block (SS/PBCH block) may be abbreviated as synchronization signal block (SSB).

With reference to the first aspect, in some implementations of the first aspect, the reference signal configuration information includes resource configuration information of a baseline reference signal used by the terminal device to perform path power measurement.

With reference to the first aspect, in some implementations of the first aspect, the measurement reporting configuration information includes any one or more of the following: a quantity of to-be-reported reference signal received powers (reference signal received powers, RSRPs); whether a path power needs to be reported; and a quantity of powers to be reported in each path when the path power needs to be reported.

Optionally, in some implementations, the reference signal measurement result includes the RSRP and/or the path power.

With reference to the first aspect, in some implementations of the first aspect, the method further includes: The location management device receives capability information of the terminal device from the terminal device. The location management device determines the reference signal configuration information and the measurement reporting configuration information based on the capability information of the terminal device, where the capability information of the terminal device includes any one or more of the following: a quantity of receive beams, a quantity of receive antenna panels, whether path power reporting is supported, and a quantity of paths whose powers can be reported when the path power reporting is supported.

In this application, the terminal device reports the capability information, and the information helps the location management device determine relatively proper reference signal configuration information and measurement reporting configuration information for the terminal device.

With reference to the first aspect, in some implementations of the first aspect, the method further includes: The location management device receives a second request message from the terminal device, where the second request message includes information about a special cell in which the terminal device is located. The location management device determines, based on the information about the special cell, the one or more cells used for positioning of the terminal device.

Optionally, the second request message further includes a result of measurement performed by the terminal device on a historical downlink reference signal in at least one cell, and some or all of the at least one cell is the same as the one or more cells used for positioning of the terminal device. The method further includes: The location management device determines the reference signal configuration information based on the measurement result.

Optionally, the result of measurement performed by the terminal device on the historical downlink reference signal in the at least one cell includes any one or more of the following: an RSRP measured by the terminal device based on serving cell channel state information (CSI) obtaining/beam management framework configuration; an RSRP measured by the terminal device based on serving cell mobility management configuration; and an RSRP of a reference signal for another purpose measured by the terminal device based on configuration of the location management device.

The reference signal for another purpose is different from the reference signal in the one or more cells used for positioning of the terminal device in this application.

In this application, the terminal device reports the result of measurement performed by the terminal device on the historical downlink reference signal in the at least one cell. The information also helps the location management device determine relatively proper reference signal configuration information and measurement reporting configuration information for the terminal device.

According to a second aspect, a positioning method is provided. The method includes: receiving assistance information from a location management device, where the assistance information includes information about one or more cells used for positioning of a terminal device and reference signal configuration information of each of the one or more cells; receiving a first request message from the location management device, where the first request message includes measurement reporting configuration information; receiving a reference signal from the one or more cells based on the reference signal configuration information; measuring the received reference signal based on the measurement reporting configuration information, to obtain a reference signal measurement result of the one or more cells; and sending a positioning message to the location management device, where the positioning message includes the reference signal measurement result of the one or more cells.

In this application, the location management device interacts with the terminal device to implement reference signal configuration and measurement reporting configuration that are used for DAOD positioning. Therefore, in this application, a cell used for positioning of the terminal device is not limited to an intra-frequency cell, that is, inter-frequency positioning may be supported. In addition, when the cell used for positioning of the terminal device is a neighboring cell, the reference signal cannot be an SSB for the neighboring cell in an existing configuration framework. This is not limited in this application. Therefore, compared with a conventional technology, this application provides a solution for configuring the reference signal configuration information and the measurement reporting configuration information that are relatively suitable for DAOD positioning.

The reference signal configuration information includes any one or more of the following information of the reference signal: time domain resource information, frequency domain resource information, and sequence information.

The reference signal includes any one of the following: a CSI-RS, a PRS, or an SSB.

With reference to the second aspect, in some implementations of the second aspect, the reference signal configuration information includes resource configuration information of a baseline reference signal used by the terminal device to perform path power measurement.

With reference to the second aspect, in some implementations of the second aspect, the measurement reporting configuration information includes any one or more of the following: a quantity of to-be-reported RSRPs; whether a path power needs to be reported; and a quantity of powers to be reported in each path when the path power needs to be reported.

Optionally, in some implementations, the reference signal measurement result includes the RSRP and/or the path power.

With reference to the second aspect, in some implementations of the second aspect, the method further includes: sending capability information of the terminal device to the location management device, where the capability information of the terminal device includes any one or more of the following: a quantity of receive beams, a quantity of receive antenna panels, whether path power reporting is supported, and a quantity of paths whose powers can be reported when the path power reporting is supported.

With reference to the second aspect, in some implementations of the second aspect, the method further includes: sending a second request message to the location management device, where the second request message includes information about a special cell in which the terminal device is located.

With reference to the second aspect, in some implementations of the second aspect, the second request message further includes a result of measurement performed by the terminal device on a historical downlink reference signal in at least one cell, and some or all of the at least one cell is the same as the one or more cells used for positioning of the terminal device.

Optionally, the result of measurement performed by the terminal device on the historical downlink reference signal in the at least one cell includes any one or more of the following: an RSRP measured by the terminal device based on serving cell channel state information (CSI) obtaining/beam management framework configuration; an RSRP measured by the terminal device based on serving cell mobility management configuration; and an RSRP of a reference signal for another purpose measured by the terminal device based on configuration of the location management device.

According to a third aspect, a communication apparatus is provided. The communication apparatus is configured to perform the method provided in the first aspect or the second aspect. Optionally, the communication apparatus may include a module configured to perform the method provided in the first aspect or the second aspect.

According to a fourth aspect, a communication apparatus is provided. The communication apparatus includes a memory and a processor, the memory is configured to store instructions, the processor is configured to execute the instructions stored in the memory, and execution of the instructions stored in the memory enables the processor to perform the method provided in the first aspect or the second aspect.

According to a fifth aspect, a chip is provided. The chip includes a processing module and a communication interface, the processing module is configured to control the communication interface to perform external communication, and the processing module is further configured to implement the method provided in the first aspect or the second aspect.

According to a sixth aspect, a computer-readable storage medium is provided. The computer-readable storage medium stores a computer program, and when the computer program is executed by a computer, the computer is enabled to implement the method provided in the first aspect or the second aspect.

According to a seventh aspect, a computer program product including instructions is provided. When the instructions are executed by a computer, the computer is enabled to implement the method provided in the first aspect or the second aspect.

According to an eighth aspect, a communication system is provided, and includes the communication apparatus that is provided in the fourth aspect and that is configured to perform the method provided in the first aspect and the communication apparatus that is provided in the fourth aspect and that is configured to perform the method provided in the second aspect.

The communication apparatus that is provided in the third aspect and that is configured to perform the method provided in the first aspect may be referred to as a location management device, and the communication apparatus that is provided in the fourth aspect and that is configured to perform the method provided in the second aspect may be referred to as a terminal device.

In this application, the location management device interacts with the terminal device to implement reference signal configuration and measurement reporting configuration that are used for DAOD positioning. Therefore, in this application, a cell used for positioning of the terminal device is not limited to an intra-frequency cell, that is, inter-frequency positioning may be supported. In addition, when the cell used for positioning of the terminal device is a neighboring cell, a reference signal cannot be an SSB for the neighboring cell in an existing configuration framework. This is not limited in this application. Therefore, compared with the conventional technology, this application provides the solution for configuring the reference signal configuration information and the measurement reporting configuration information that are relatively suitable for DAOD positioning.

DESCRIPTION OF EMBODIMENTS

The following describes technical solutions of this application with reference to the accompanying drawings.

Unless otherwise defined, all technical and scientific terms used in this specification have a same meaning as that usually understood by a person skilled in the art of this application. The terms used in the specification of this application are merely for the purpose of describing specific embodiments, and are not intended to limit this application.

Figure 1:
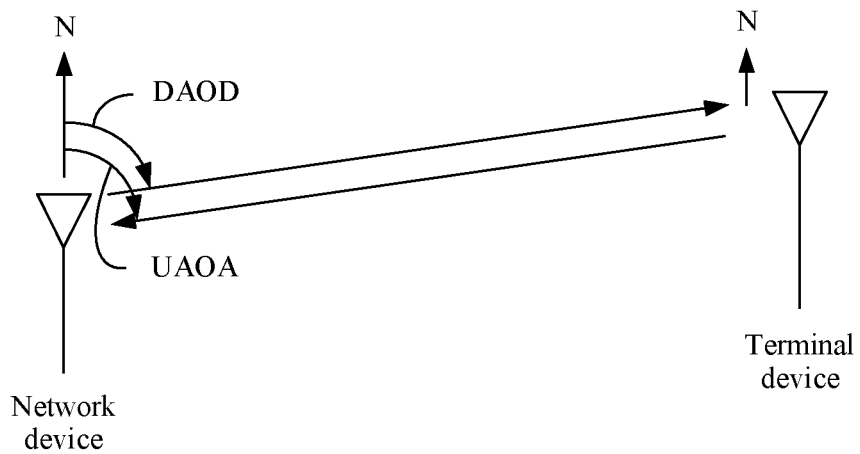
FIG. 1 is a schematic diagram of a downlink angle of departure (DAOD) and an uplink angle of arrival (UAOA)

FIG. 1 is a schematic diagram of a downlink angle of departure (DAOD). As shown in FIG. 1, the DAOD represents an electromagnetic wave departure direction observed from a network device during downlink electromagnetic wave transmission between the network device and a terminal device.

As described above, positioning of the terminal device may be implemented based on DAODs between the terminal device and each of at least two network devices. The at least two network devices may include a serving base station (which may also be referred to as a serving cell) and/or a neighboring cell base station (which may also be referred to as a neighboring cell) of the terminal device.

A prerequisite for implementing DAOD positioning is that the DAOD is obtained through measurement first.

Figure 2:
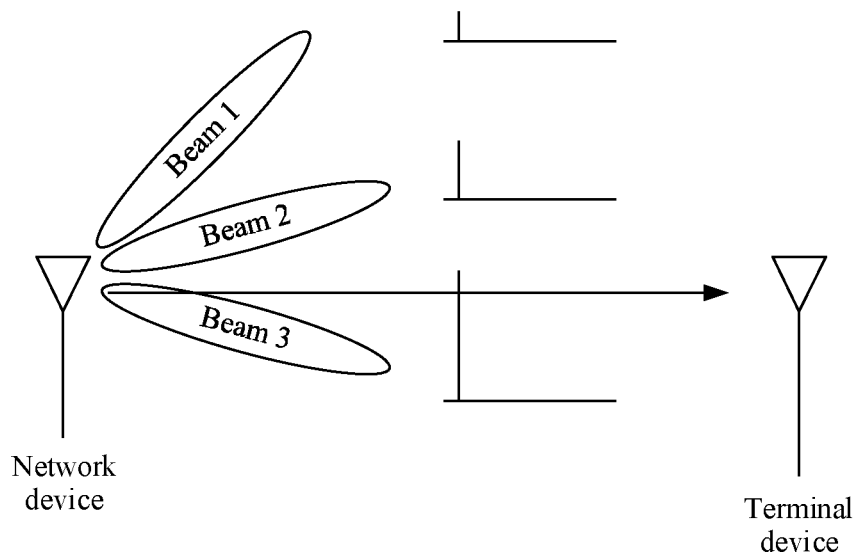
FIG. 2 is a schematic diagram of DAOD measurement.

In an example, FIG. 2 is a schematic diagram of DAOD measurement. As shown in FIG. 2, three beams (a beam 1, a beam 2, and a beam 3 shown in FIG. 2) are preconfigured on a network device. The network device pre-measures gains of each beam at different radiation angles, and sends a reference signal to a terminal device by using the three beams. When the terminal device is located in a direction, for example, 30 degrees shown in FIG. 2, the terminal device measures reference signal received powers (RSRPs) on the three beams.

The beam 1 is not directed to the terminal device, and a measured receive power is relatively low. Compared with the beam 1, the beam 2 is slightly directed to the terminal device, and a measured receive power is medium. The beam 3 is relatively directed to the terminal device, and a measured receive power is relatively high.

After the terminal device feeds back measurement results to the network device, the network device matches the measurement results with the pre-measured gains of each beam at different radiation angles, and finds that the measurement results better match relative gains of the three beams in the 30-degree direction, so that the terminal device is determined to be in the 30-degree direction, in other words, the DAOD is determined to be 30 degrees.

It can be learned from FIG. 2 that, reference signal configuration information and measurement reporting configuration information need to be configured for the terminal device first before DAOD measurement.

Currently, two configuration frameworks are available for configuring the reference signal configuration information and the measurement reporting configuration information for the terminal device: framework 1, that is, a serving cell CSI obtaining/beam management framework (a CSI-MeasConfig information element in TS 38.331); and framework 2, that is, a serving cell mobility management framework (MeasObjectNR in TS 38.331).

The framework 1 is mainly applicable to a scenario (carrier aggregation) where all cells participating in positioning are serving cells. When the cells participating in positioning include a neighboring cell, inter-frequency measurement is not supported, and SSB measurement of the neighboring cell is not supported. A reporting mechanism in the framework 2 is not suitable for DAOD positioning.

It can be learned from the foregoing description that a solution for reference signal configuration and measurement reporting configuration in DAOD positioning needs to be provided.

Accordingly, this application provides a positioning method and an apparatus, to better implement reference signal configuration and measurement reporting configuration that are used for DAOD positioning.

The embodiments of this application may be applied to a 5G system or a new radio (NR) system.

Figure 3:
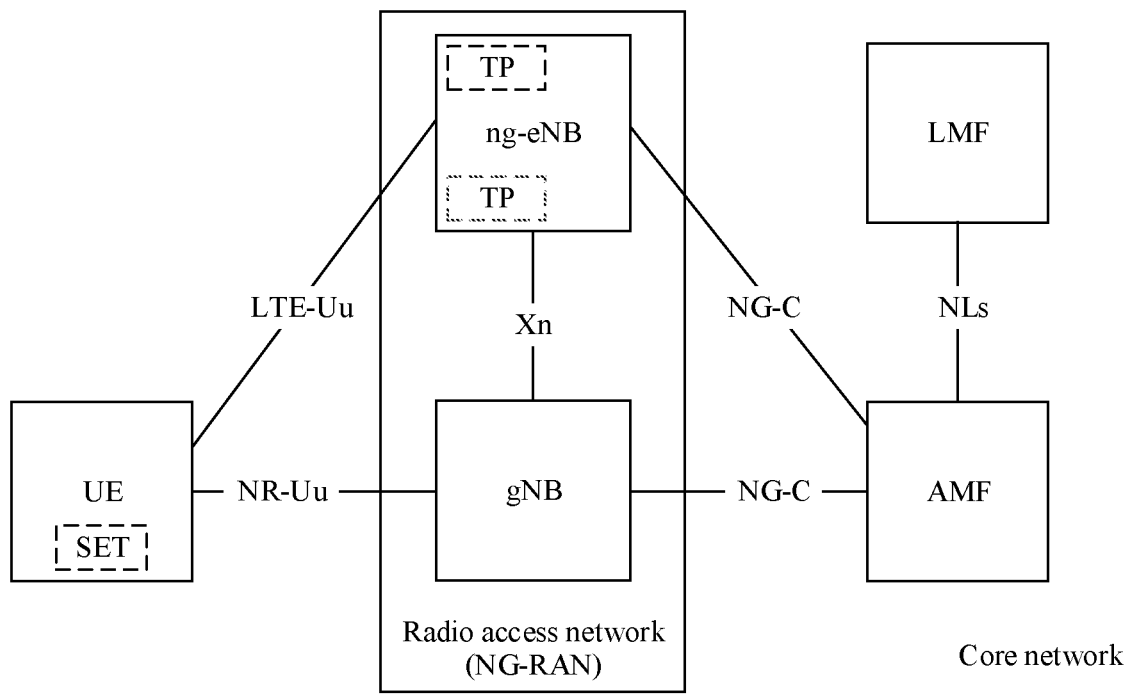
FIG. 3 and FIG. 4 are schematic diagrams of communication architectures to which an embodiment of this application may be applied.

FIG. 3 is a schematic diagram of a communication architecture to which an embodiment of this application may be applied. The communication architecture includes a terminal device (shown as UE in FIG. 3), a radio access network (an NG-RAN), and a core network.

The core network includes an access and mobility management function (access and mobility management function, AMF), a location management function (location management function, LMF), and other functions. The AMF functions as a gateway and the like, and the LMF functions as a positioning center and the like. The AMF and LMF are connected through an NLs interface.

The radio access network (NG-RAN) includes one or more ng-eNBs and gNBs. A ng-eNB indicates an LTE base station that accesses the 5G core network, and a gNB indicates a 5G base station that accesses the 5G core network.

A ng-eNB and a gNB, two ng-eNBs, or two gNBs communicate with each other over an Xn interface. The Xn interface may also be referred to as an XnAP interface.

The radio access network is connected to the core network via the AMF through an NG-C interface.

The terminal device is connected to the radio access network via the ng-eNB through an LTE-Uu interface. The terminal device may be alternatively connected to the radio access network via the gNB through an NR-Uu interface.

The core network may communicate with the terminal device through an LPP/NPP protocol.

It should be understood that the communication architecture may include one or more base stations (including the ng-eNB and the gNB).

It should be further understood that the communication architecture may include one or more terminal devices, for example, one or more terminal device sets (for example, a UE set shown in FIG. 3).

One gNB may send data or control signaling to one or more terminal devices. A plurality of gNBs may simultaneously send data or control signaling to one terminal device.

Alternatively, the ng-eNB in FIG. 3 may be replaced with a transmission point (TP), for example, a TP shown in FIG. 3.

Figure 4:
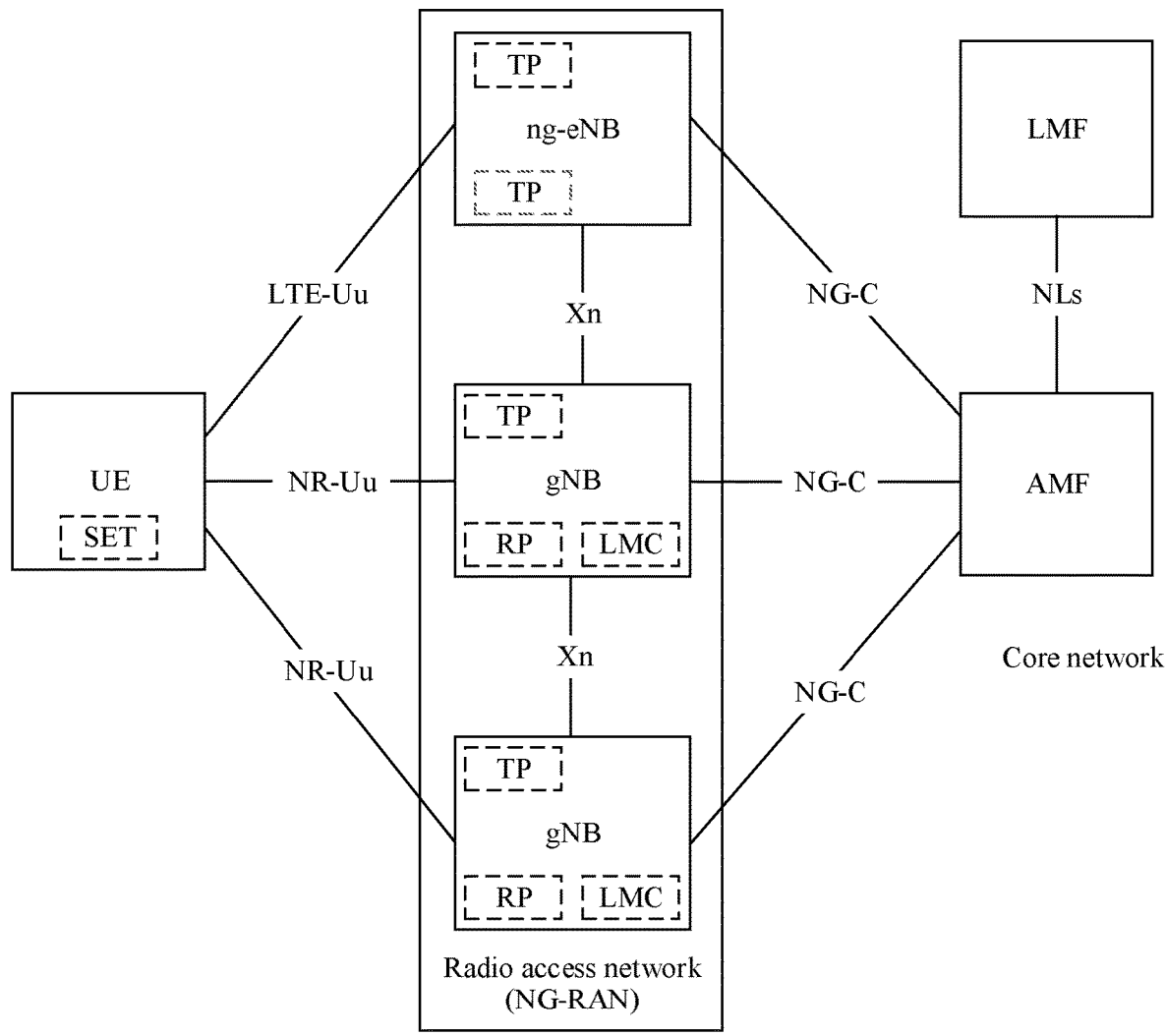

FIG. 4 is a schematic diagram of another communication architecture to which an embodiment of this application may be applied. The communication architecture includes a terminal device (shown as UE in FIG. 4), a radio access network (an NG-RAN), and a core network.

The core network includes functions such as AMF and LMF. The AMF functions as a gateway and the like, and the LMF functions as a positioning center and the like. The AMF and LMF are connected through an NLs interface.

The radio access network (NG-RAN) includes one or more ng-eNBs and gNBs. A ng-eNB indicates an LTE base station that accesses the 5G core network, and a gNB indicates a 5G base station that accesses the 5G core network.

The gNB includes a location management component (location management component, LMC), and the LMC may implement some functions of the LMF. In this way, to implement the LMF functions that can be implemented by the LMC, the radio access network does not need to access the 5G core network via the AMF. Therefore, a signaling delay can be reduced.

It should be understood that the communication architecture may include one or more base stations (including the ng-eNB and the gNB).

It should be further understood that the communication architecture may include one or more terminal devices, for example, one or more terminal device sets (for example, a UE set shown in FIG. 4).

One gNB may send data or control signaling to one or more terminal devices. A plurality of gNBs may simultaneously send data or control signaling to one terminal device.

A terminal device in the embodiments of this application may be user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. Alternatively, the terminal device may be a cellular phone, a cordless phone, a session initiation protocol (session initiation protocol, SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a 5G network, a terminal device in a future evolved public land mobile network (PLMN), or the like.

A network device in the embodiments of this application may be configured to communicate with one or more terminals, or may be configured to communicate with one or more base stations having some terminal functions (for example, communication between a macro base station and a micro base station, such as an access point). The base station may be an evolved NodeB (evolved NodeB, eNB) in an LTE system, or a gNB (gNB) in a 5G system or an NR system. In addition, the base station may also be an access point (AP), a transmission reception point (transmission reception point, TRP), a central unit (CU), or another network entity, and may provide some or all of functions of the foregoing network entities. For example, the network device in the embodiments of this application may correspond to an access network device in the communication architectures shown in FIG. 3 and FIG. 4.

A location management device in the embodiments of this application indicates a core network device, for example, the LMF shown in FIG. 3, that has a location management function. Alternatively, a location management device indicates an apparatus, for example, the LMC shown in FIG. 4, that has a location management function and that can be placed in an access network device.

This application provides a solution for reference signal configuration and measurement reporting configuration for DAOD positioning based on an LTE positioning protocol (LPP). A positioning method according to an embodiment of this application includes: A location management device provides reference signal configuration information and measurement reporting configuration information of one or more cells to a terminal device through an LPP. The location management device receives a result of reference signal measurement performed by the terminal device on one or more cells from the terminal device through the LPP, and obtains DAODs of the terminal device relative to the one or more cells based on the result of reference signal measurement. The following describes in detail the method with reference to FIG. 5.

Figure 5:
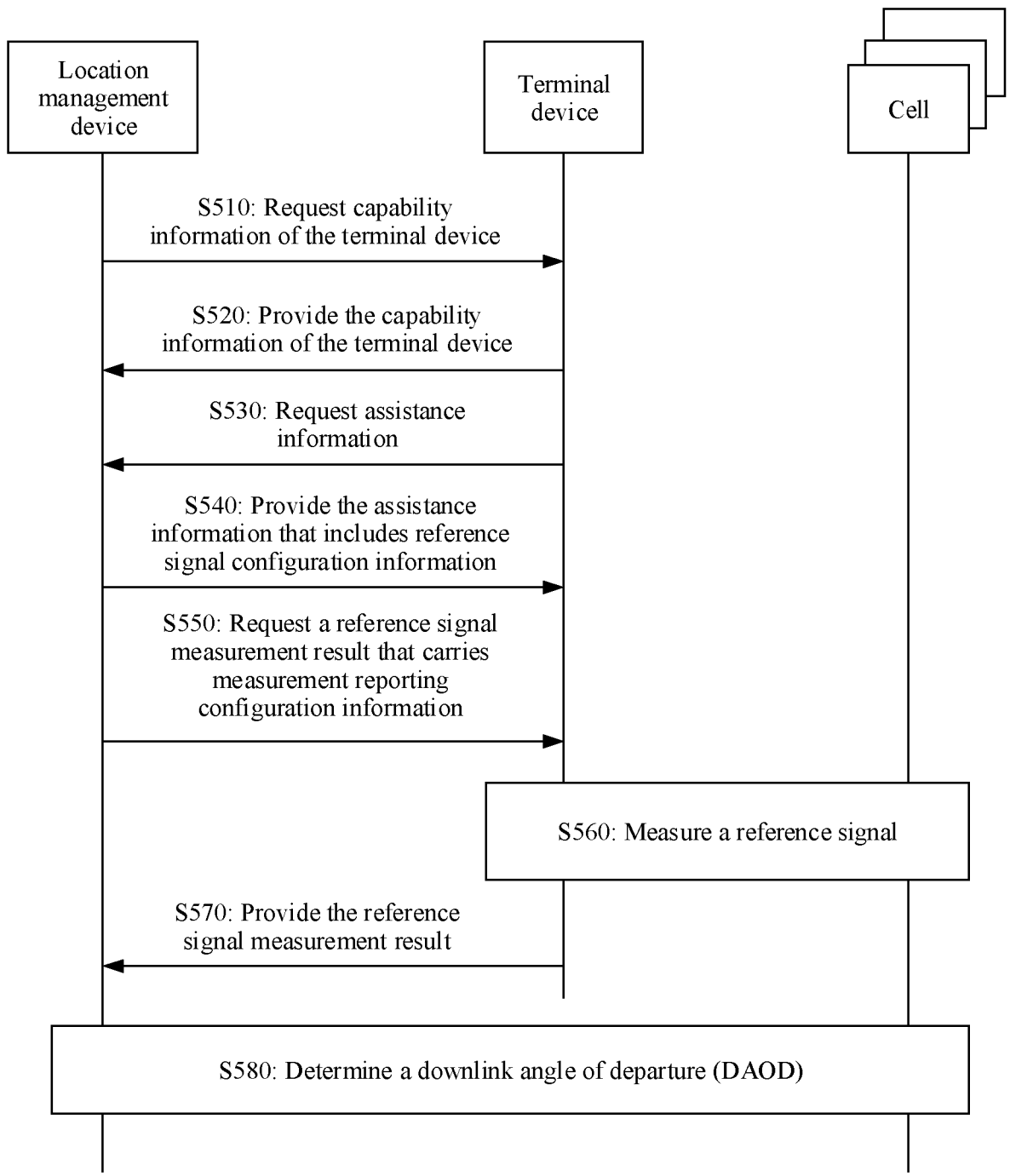
FIG. 5 is a schematic flowchart of a positioning method according to an embodiment of this application.

FIG. 5 is a schematic flowchart of a positioning method 500 according to an embodiment of this application. A location management device in FIG. 5 may correspond to the LMF in FIG. 3 or FIG. 4, or the LMC in FIG. 4. A terminal device in FIG. 5 may correspond to the UE in FIG. 3 or FIG. 4. A base station in a cell in FIG. 5 may correspond to the eNB or the gNB in FIG. 3 or FIG. 4. The method 500 includes the following steps.

S510: The location management device requests capability information of the terminal device.

For example, the location management device sends, to the terminal device, a request message used to request the capability information of the terminal device.

Optionally, the location management device may request the terminal device to report specific pieces of capability information.

For example, the location management device sends, to the terminal device, the request message used to request the capability information of the terminal device. The request message includes information used to indicate the terminal device to provide any one or more of the following information: receive beam information, receive antenna panel information, whether path power reporting is supported, and a quantity of paths whose powers can be reported when path power reporting is supported.

The receive beam information includes a total quantity of receive beams of the terminal device, and may further include a quantity of receive beams that can be simultaneously formed on each antenna panel of the terminal device.

The receive antenna panel information may include a total quantity of receive antenna panels of the terminal device.

Whether path power reporting is supported refers to whether the terminal device supports single-path power reporting. Path power reporting is different from RSRP reporting.

It should be understood that, the terminal device is indicated to report whether path power reporting is supported, to help the location management device determine a DAOD on a path level.

The quantity of paths whose powers can be reported when path power reporting is supported refers to a maximum quantity of paths whose powers can be measured and reported by the terminal device when the path power is reported.

S520: The terminal device reports the capability information of the terminal device to the location management device.

Optionally, the terminal device may report the capability information of the terminal device to the location management device based on the request message in step S510.

For example, the terminal device may report, to the location management device, all or a part of the capability information that the location management device indicates that the terminal device needs to provide.

Optionally, the terminal device may spontaneously report the capability information of the terminal device to the location management device. That is, step S520 may not depend on step S510. In other words, step S510 may not be performed.

The capability information of the terminal device reported by the terminal device to the location management device may include any one or more of the following: receive beam information, receive antenna panel information, whether path power reporting is supported, and a quantity of paths whose powers can be reported when path power reporting is supported.

The terminal device reports the receive beam information to the location management device, so that the location management device can learn of a quantity of receive beams of the terminal device, and can further estimate signal receiving duration of the terminal device. This helps the location management device configure proper measurement reporting configuration information for the terminal device. For example, the measurement reporting configuration information indicates a time period between a time when a reference signal is received and a time when a reference signal measurement result is reported.

The terminal device reports the receive panel information to the location management device, so that the location management device may learn of a quantity of receive panels of the terminal device, and therefore learns of a quantity of independent receive beams on each panel. The location management device may refer to the information to determine proper reference signal configuration information for the terminal device.

The terminal device reports, to the location management device, whether path power reporting is supported and the quantity of paths whose powers can be reported when path power reporting is supported, so that the location management device determines proper measurement reporting configuration information for the terminal device.

For example, when learning that the terminal device supports path power reporting, the location management device may indicate, based on the measurement reporting configuration information, the terminal device to report a path power.

For another example, when learning that the terminal device supports path power reporting and the quantity of paths whose powers can be reported, the location management device may indicate, based on the measurement reporting configuration information, the quantity of paths whose powers need to be reported when the terminal device reports path powers.

It should be noted that the foregoing capability information of the terminal device is merely enumerated but is not limited. In actual application, based on a specific requirement, the terminal device may further report capability information of other types.

S530: The terminal device requests the location management device to provide assistance information.

For example, the terminal device sends, to the location management device, a request message used to request the assistance information.

The assistance information requested by the terminal device indicates information that helps the terminal device measure the reference signal.

The assistance information includes the reference signal configuration information.

The assistance information further includes information about a cell participating in positioning of the terminal device.

Optionally, the request message sent by the terminal device to the location management device for requesting the assistance information may further carry information that helps the location management device determine the reference signal configuration information.

Optionally, the request message sent by the terminal device to the location management device for requesting the assistance information carries a result of measurement performed by the terminal device on a historical downlink reference signal in at least one cell. The at least one cell includes a serving cell and/or a neighboring cell of the terminal device.

The result of measurement performed by the terminal device on the historical downlink reference signal in the at least one cell may include any one or more of the following:

a reference signal received power (RSRP) measured by the terminal device based on serving cell channel state information (CSI) obtaining/beam management framework configuration;

an RSRP measured by the terminal device based on serving cell mobility management configuration; and an RSRP of a reference signal for another purpose measured by the terminal device based on configuration of the location management device, where the reference signal for another purpose is different from a reference signal in one or more cells used for positioning of the terminal device in this application.

It should be understood that the location management device may refer to the result of measurement performed by the terminal device on the historical downlink reference signal in the at least one cell, and configure, for the terminal device, reference signal configuration information of the cell participating in positioning.

In addition, the location management device may further select a baseline reference signal in a path for the terminal device based on the result of measurement performed by the terminal device on the historical downlink reference signal in the at least one cell.

Optionally, the request message sent by the terminal device to the location management device for requesting the assistance information carries a special cell (Special cell, spCell) in which the terminal device is located.

The spCell of the terminal device may be a primary cell (PCell) of the terminal device and a primary secondary cell (PSCell) that is in dual connectivity.

It should be understood that the location management device may roughly estimate a location of the terminal device based on the spCell in which the terminal device is located, to help determine the cell participating in positioning of the terminal device.

S540: The location management device provides the assistance information for the terminal device, where the assistance information includes information about the one or more cells used for positioning of the terminal device and reference signal configuration information of each of the one or more cells.

For example, the location management device may determine, based on the information that is about the special cell in which the terminal device is located and that is obtained according to step S530, the one or more cells that participate in positioning of the terminal device.

For another example, the location management device may determine reference signal configuration information of all or some cells participating in positioning based on the measurement result that is obtained in step S530 and that is of the terminal device on the historical downlink reference signal in the at least one cell.

It should be understood that if the at least one cell overlaps the one or more cells participating in positioning, that is, some or all of the at least one cell is the same as the one or more cells used for positioning of the terminal device, the location management device may determine relatively proper reference signal configuration information in an overlapping cell for the terminal device based on the measurement result that is of the terminal device on the historical downlink reference signal in the at least one cell and that is obtained in step S530.

For ease of description and understanding, the cell participating in positioning of the terminal device is referred to as a positioning cell in the following.

The assistance information provided by the location management device to the terminal device includes information about the positioning cell and reference signal configuration information of the positioning cell.

The information about the positioning cell may include cell frequency information, and may further include cell synchronization information, reference signal receiving window information, and the like.

The reference signal configuration information of the positioning cell includes any one or more of the following information of a reference signal in the positioning cell: time domain resource information of a reference signal resource, frequency domain resource information of the reference signal resource, and sequence information of the reference signal resource.

The reference signal includes any one of the following: a channel state information reference signal (CSI-RS), a positioning reference signal (PRS), or a synchronization signal/physical broadcast channel block (SS/PBCH block). The synchronization signal/physical layer broadcast channel block (SS/PBCH block) may be abbreviated as synchronization signal block (SSB).

The reference signal resource may include any one of the following:

a PRS resource set;
a CSI-RS resource set;
an SSB resource set; and
a PRS resource set and an SSB resource set.

Each PRS resource set may include one or more PRS resources.

Each SSB resource set may include a plurality of SSB resources, and each SSB resource includes SSB frequency information and an SSB index.

Optionally, the reference signal resource may further include a baseline resource used by the terminal device to perform path power measurement.

For example, a plurality of PRS resources in the PRS resource set or the plurality of SSB resources in one SSB resource set may further include one or more baseline resources.

It should be understood that, based on the one or more baseline resources, the terminal device may select a receive beam and report a path power.

S550: The location management device sends a request to the terminal device for the reference signal measurement result, where the request carries the measurement reporting configuration information, and the measurement reporting configuration information includes any one or more of the following:

a quantity of to-be-reported RSRPs;
information indicating whether a path power needs to be reported; and
a quantity of powers to be reported in each path when the path power needs to be reported.

For example, when the terminal device does not support path power reporting, the measurement reporting configuration information includes the quantity of to-be-reported RSRPs, or may further include information indicating that the path power does not need to be reported.

For another example, when the terminal device supports path power reporting, the measurement reporting configuration information includes information indicating that the path power needs to be reported, or may further include the quantity of powers to be reported in each path.

The location management device may learn, based on the capability information of the terminal device obtained in step S520, whether the terminal device supports path power reporting.

Optionally, an implementation of step S550 is as follows: The location management device sends, to the terminal device, a request message that carries measurement reporting configuration information.

S560: The terminal device measures the reference signal in the positioning cell, to obtain a reference signal measurement result of the positioning cell.

The terminal device determines the positioning cell based on the cell information received from the location management device in step S540, that is, determines reference signals of specific cells to be received.

The terminal device receives the reference signal from the corresponding positioning cell based on the reference signal configuration information received from the location management device in step S540. It should be understood that the corresponding positioning cell also receives the corresponding reference signal configuration information from the location management device. In other words, the terminal device and one positioning cell perform reference signal transmission based on the same or similar reference signal configuration information.

The terminal device measures the received reference signal based on the measurement reporting configuration information received from the location management device in step S550, to obtain the reference signal measurement result of the positioning cell.

If the measurement reporting configuration information indicates that the path power does not need to be reported, the terminal device performs RSRP measurement on the reference signal in the positioning cell, and determines a quantity of to-be-reported RSRPs based on a quantity that is of to-be-reported RSRPs and that is indicated in the measurement reporting configuration information. For example, the terminal device measures RSRPs of a PRS resource set and/or an SSB resource set of the positioning cell, and a quantity of the RSRPs is determined based on a configuration of the measurement reporting configuration information.

If the measurement reporting configuration information indicates that the path power needs to be reported, the terminal device performs path power measurement on the reference signal in the positioning cell, and determines a quantity of powers to be reported on each path based on the quantity that is of powers to be reported on each path and that is indicated in the measurement reporting configuration information. For another example, the terminal device measures path powers of a PRS resource set and/or an SSB resource set of the positioning cell, and a quantity of powers on each path is determined based on a configuration of the measurement reporting configuration information.

If a reporting configuration indicated by the measurement reporting configuration information is non-path-power reporting, the terminal device is required to receive a plurality of downlink beams in one cell by using a same receive beam (which is denoted as a receive beam A). The receive beam A is a receive beam corresponding to a largest RSRP in RSRPs of the plurality of downlink beams obtained by the terminal device.

For example, for a cell, there are M downlink beams on a network side, and there are N receive beams on a terminal side. The terminal device may obtain M*N RSRPs in total. In this case, the receive beam used by the terminal device is a receive beam corresponding to a maximum RSRP in the M*N RSRPs.

If the reporting configuration indicated by the measurement reporting configuration information is path power reporting, the network side configures one or more baseline reference signals. For each baseline reference signal, the terminal device selects one receive beam that has a largest RSRP for baseline reference signal transmission, and receives other transmit beams by using the receive beam. Such processing is repeatedly performed on other baseline reference signals in turn.

For example, for one cell, there are M downlink beams, there are O baseline reference signals in the M downlink beams (remaining M-O beams are not sent by using baseline reference signals), and there are N receive beams on the terminal side. For each baseline reference signal, the terminal device selects a receive beam to maximize an RSRP of the baseline reference signal, receives the M downlink beams by using the receive beam, selects a path for measurement, and obtains M path powers for the path. The terminal device repeats the foregoing operations for the O baseline reference signals to select O receive beams, and obtains M*O path powers in total. In this case, signals on one transmit beam may be received by using a plurality of receive beams.

S570: The terminal device sends the reference signal measurement result obtained in step S560 to the location management device.

The terminal device sends a reference signal measurement result of each positioning cell to the location management device.

Optionally, an implementation of step S570 is as follows: The terminal device sends, to the location management device, a response message that carries the reference signal measurement result.

S580: The location management device obtains DAODs based on the reference signal measurement result.

Optionally, the location management device may send the reference signal measurement result to the corresponding positioning cell, and a base station of each positioning cell calculates a DAOD based on the reference signal measurement result, and feeds back the DAOD to the location management device.

Optionally, the location management device pre-collects beam information of each positioning cell, and obtains, through calculation based on the reference signal measurement result, the DAOD corresponding to each positioning cell.

If the terminal device reports an RSRP in step S570, in other words, the reference signal measurement result includes the RSRP, one positioning cell corresponds to one DAOD.

If the terminal device reports path powers in step S570, in other words, the reference signal measurement result includes the path powers, one positioning cell may correspond to a plurality of DAODs, and each path corresponds to one DAOD.

Optionally, in some embodiments, step S510 may not be performed. Correspondingly, in step S520, the terminal device spontaneously reports the capability information of the terminal device to the location management device.

Optionally, in some embodiments, step S510 and step S520 may not be performed.

In a possible implementation, the terminal device does not send the capability information to the location management device. Correspondingly, in step S540, the location management device determines the reference signal configuration information without referring to the capability information of the terminal device. In step S550, the location management device determines the measurement reporting configuration information without referring to the capability information of the terminal device.

In another possible implementation, after receiving the capability information reported by the terminal device once, the location management device may refer to the capability information previously reported by the terminal device for subsequently configuring the reference signal configuration information and the measurement reporting configuration information for the terminal device for a plurality of times. That is, the terminal device does not need to report the capability information of the terminal device in each configuration process.

Optionally, in some embodiments, step S530 may not be performed. Correspondingly, in step S540, the location management device provides the assistance information to the terminal device without relying on a request of the terminal device. In other words, step S540 may be performed independent of step S530. For example, after receiving a positioning request sent by the serving cell of the terminal device, the location management device provides the assistance information for the terminal device.

In this embodiment, in step S540, the location management device may roughly estimate the location of the terminal device based on historical data, and further determine the one or more cells (namely, positioning cells) that participate in positioning of the terminal device.

In this embodiment, in step S540, the location management device may determine, based on the reference signal configuration information obtained from the positioning cells, the reference signal configuration information delivered to the terminal device.

In this application, the location management device interacts with the terminal device to implement reference signal configuration and measurement reporting configuration that are used for DAOD positioning. Therefore, in this application, a cell used for positioning of the terminal device is not limited to an intra-frequency cell, that is, inter-frequency positioning may be supported. In addition, when the cell used for positioning of the terminal device is a neighboring cell, the reference signal cannot be an SSB for the neighboring cell in an existing configuration framework. This is not limited in this application.

In addition, in the existing configuration framework, a quantity of RSRPs reported by the terminal device once is limited. In this application, the quantity of RSRPs reported by the terminal device is not limited. In addition, path power reporting is further supported in a configuration manner provided in this application.

Furthermore, in some embodiments of this application, the terminal device reports the capability information, and the information helps the location management device determine relatively proper reference signal configuration information and measurement reporting configuration information for the terminal device.

Furthermore, in some embodiments of this application, the terminal device reports the result of measurement performed by the terminal device on the historical downlink reference signal in the at least one cell. The information also helps the location management device determine relatively proper reference signal configuration information and measurement reporting configuration information for the terminal device.

Therefore, compared with a conventional technology, this application provides a solution for configuring the reference signal configuration information and the measurement reporting configuration information that are relatively suitable for DAOD positioning.

As an example rather than a limitation, the following provides a specific implementation of step S510 to step 580.

Step S510 includes: The location management device sends a request capability message (RequestCapability message) to the terminal device, where the RequestCapability message carries a DAOD-request capability information element (DAOD-RequestCapability IE), and the DAOD-RequestCapability IE indicates the capability information that the terminal device needs to provide.

Optionally, the RequestCapability message may further include the following IEs:

| | |
|---|---|
| commonIEsRequestCapabilities OPTIONAL,-- Need ON | CommonIEsRequestCapabilities |
| a-gnss-RequestCapabilities OPTIONAL,-- Need ON | A-GNSS-RequestCapabilities |
| otdoa-RequestCapabilities OPTIONAL,-- Need ON | OTDOA-RequestCapabilities |
| ecid-RequestCapabilities OPTIONAL,-- Need ON | ECID-RequestCapabilities |
| epdu-RequestCapabilities OPTIONAL,-- Need ON ..., | EPDU-Sequence |
| [[ sensor-RequestCapabilities-r13 OPTIONAL,-- Need ON | Sensor-RequestCapabilities-r13 |
| tbs-RequestCapabilities-r13 OPTIONAL,-- Need ON | TBS-RequestCapabilities-r13 |
| wlan-RequestCapabilities-r13 OPTIONAL,-- Need ON | WLAN-RequestCapabilities-r13 |
| bt-RequestCapabilities-r13 OPTIONAL-- Need ON ]] | BT-RequestCapabilities-r13 |

Step S520 includes: The terminal device sends a provide capability message (ProvideCapability message) to the location management device, where the ProvideCapability message carries a DAOD-provide capability information element (DAOD-ProvideCapability IE), and the DAOD-ProvideCapability IE carries the capability information of the terminal device.

Optionally, the ProvideCapability message may further include the following IEs:

| | | |
|---|---|---|
| commonIEsProvideCapabilities OPTIONAL, | CommonIEsProvideCapabilities | |
| a-gnss-ProvideCapabilities OPTIONAL, | A-GNSS-ProvideCapabilities | |
| otdoa-ProvideCapabilities OPTIONAL, | OTDOA-ProvideCapabilities | |
| ecid-ProvideCapabilities | ECID-ProvideCapabilities | OPTIONAL, |
| epdu-ProvideCapabilities OPTIONAL, ..., | EPDU-Sequence | |

-continued

| | |
|---|---|
| [[ sensor-ProvideCapabilities-r13 OPTIONAL, | Sensor-ProvideCapabilities-r13 |
| tbs-ProvideCapabilities-r13 OPTIONAL, | TBS-ProvideCapabilities-r13 |
| wlan-ProvideCapabilities-r13 OPTIONAL, | WLAN-ProvideCapabilities-r13 |
| bt-ProvideCapabilities-r13 OPTIONAL ]] | BT-ProvideCapabilities-r13 |

Step S530 includes: The terminal device sends a request assistance data message (RequestAssistanceData message) to the location management device, where the RequestAssistanceData message carries a DAOD-request assistance data information element (DAOD-RequestAssistanceData IE), and the DAOD-RequestAssistanceData IE indicates the result of measurement performed by the terminal device on the historical downlink reference signal in the at least one cell, and may further indicate the information about the special cell in which the terminal device is located.

Optionally, the RequestAssistanceData message may further include the following IEs:

| | |
|---|---|
| commonIEsRequestAssistanceData OPTIONAL, | CommonIEsRequestAssistanceData |
| a-gnss-RequestAssistanceData OPTIONAL, | A-GNSS-RequestAssistanceData |
| otdoa-RequestAssistanceData OPTIONAL, | OTDOA-RequestAssistanceData |
| epdu-RequestAssistanceData OPTIONAL, ..., | EPDU-Sequence |
| [[ sensor-RequestAssistanceData-r14 OPTIONAL, | Sensor-RequestAssistanceData-r14 |
| tbs-RequestAssistanceData-r14 OPTIONAL, | TBS-RequestAssistanceData-r14 |
| wlan-RequestAssistanceData-r14 OPTIONAL ]] | WLAN-RequestAssistanceData-r14 |

Step S540 includes: The location management device sends a provide assistance data message (ProvideAssistanceData message) to the terminal device, where the ProvideAssistanceData message carries a DAOD-provide assistance data information element (DAOD-ProvideAssistanceData IE), and the DAOD-ProvideAssistanceData IE indicates the reference signal configuration information, and may further indicate the information about the one or more cells used for positioning of the terminal device.

Optionally, the ProvideAssistanceData message may further include the following IEs:

| | |
|---|---|
| commonIEsProvideAssistanceData OPTIONAL,-- Need ON | CommonIEsProvideAssistanceData |
| a-gnss-ProvideAssistanceData OPTIONAL,-- Need ON | A-GNSS-ProvideAssistanceData |
| otdoa-ProvideAssistanceData OPTIONAL,-- Need ON | OTDOA-ProvideAssistanceData |
| epdu-Provide-Assistance-Data OPTIONAL,-- Need ON ..., | EPDU-Sequence |
| [[ sensor-ProvideAssistanceData-r14 Sensor-ProvideAssistanceData-r14 OPTIONAL, --Need ON | |
| tbs-ProvideAssistanceData-r14 OPTIONAL,-- Need ON | TBS-ProvideAssistanceData-r14 |
| wlan-ProvideAssistanceData-r14 OPTIONAL -- Need ON ]] | WLAN-ProvideAssistanceData-r14 |

Step S550 includes: The location management device sends a request location information message (RequestLocationInformation message) to the terminal device, where the RequestLocationInformation message carries a DAOD-request location information information element (DAOD-RequestLocationInfomation IE), and the DAOD-RequestLocationInformation IE indicates the measurement reporting configuration information.

Optionally, the RequestLocationInformation message may further provide the following IEs:

```
commonIEsRequestLocationInformation
                                    CommonIEsRequestLocationInformation
OPTIONAL,-- Need ON
    a-gnss-RequestLocationInformation    A-GNSS-RequestLocationInformation
OPTIONAL,-- Need ON
    otdoa-RequestLocationInformationOTDOA-RequestLocationInformation
OPTIONAL,-- Need ON
    ecid-RequestLocationInformation      ECID-RequestLocationInformation
OPTIONAL,-- Need ON
    epdu-RequestLocationInformation      EPDU-Sequence
OPTIONAL,-- Need ON
    ...,
    [[
    sensor-RequestLocationInformation-r13
                                    Sensor-RequestLocationInformation-r13
OPTIONAL,-- Need ON
    tbs-RequestLocationInformation-r13   TBS-RequestLocationInformation-r13
OPTIONAL,-- Need ON
    wlan-RequestLocationInformation-r13  WLAN-RequestLocationInformation-r13
OPTIONAL,-- Need ON
    bt-RequestLocationInformation-r13    BT-RequestLocationInformation-r13
OPTIONAL -- Need ON
    ]]
```

Step S570 includes: The terminal device sends a provide location information message (ProvideLocationInformation message) to the location management device, where the ProvideLocationInformation message carries a DAOD-provide location information information element (DAOD-ProvideLocationInformation IE), and the DAOD-ProvideLocationInformation IE indicates the reference signal measurement result.

Optionally, the ProvideLocationInformation message may further provide the following IEs:

```
commonIEsProvideLocationInformation
                                    CommonIEsProvideLocationInformation
OPTIONAL,
    a-gnss-ProvideLocationInformation    A-GNSS-ProvideLocationInformation
OPTIONAL,
    otdoa-ProvideLocationInformation OTDOA-ProvideLocationInformation
OPTIONAL,
    ecid-ProvideLocationInformation      ECID-ProvideLocationInformation
OPTIONAL,
    epdu-ProvideLocationInformation      EPDU-Sequence
OPTIONAL,
    ...,
    [[
    sensor-ProvideLocationInformation-r13
                                    Sensor-ProvideLocationInformation-r13
OPTIONAL,
    tbs-ProvideLocationInformation-r13   TBS-ProvideLocationInformation-r13
OPTIONAL,
    wlan-ProvideLocationInformation-r13  WLAN-ProvideLocationInformation-r13
OPTIONAL,
    bt-ProvideLocationInformation-r13    BT-ProvideLocationInformation-r13
OPTIONAL
    ]]
```

It may be understood that, this application implements configuration used for DAOD positioning based on an existing LTE positioning protocol (LPP). In this way, compatibility with the existing protocol can be ensured with only small signaling overheads increased.

As shown in FIG. 1, if an electromagnetic wave is transmitted from the terminal device to the network device, an electromagnetic wave arrival direction observed from the network device may also form an angle of arrival. The angle of arrival may be referred to as an uplink angle of arrival (UAOA). According to a definition of the UAOA, the UAOA is obtained based on uplink signal measurement.

It can be learned from FIG. 1 that although the definitions of UAOA and the DAOD are defined differently and obtained in different manners, but are essentially a same physical quantity, namely, a direction angle of the terminal device relative to the network device. The direction angle may be collectively referred to as an angle of arrival (AoA).

That is, if the DAOD is obtained, the UAOA is also obtained. The UAOA is also obtained when the DAOD is obtained according to the technical solutions provided in this application. Therefore, the technical solutions provided in this application may not only be used to determine the DAOD, but may also be used to determine the UAOA. It may be considered that the technical solutions provided in this application may be used to determine the AoA.

In any one of the foregoing embodiments, in an optional implementation, the "DAOD" may be replaced with the "AoA", and the "AoA" may represent the DAOD, or may represent the UAOA.

In addition, it should be further noted that the angle of arrival (AoA) includes two dimensions: a vertical direction angle (for example: Zenith angle of arrival, ZOA) and a horizontal direction angle (for example: Azimuth angle of arrival, AOA).

Figure 6:
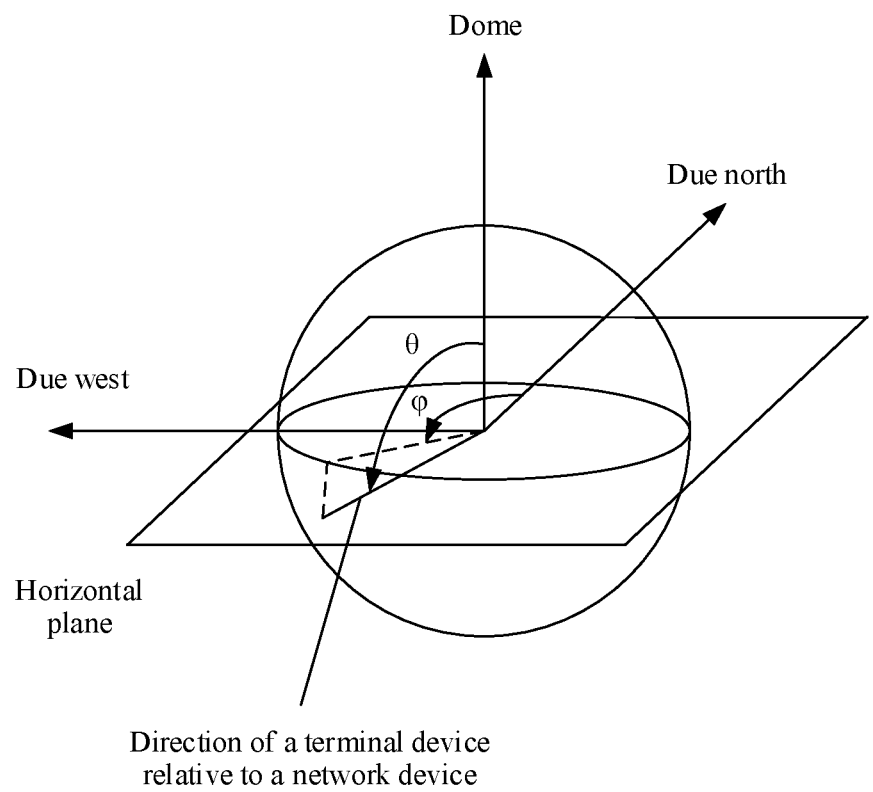
FIG. 6 is a schematic diagram of a vertical direction angle and a horizontal direction angle.

As shown in FIG. 6, the vertical direction angle represents an included angle θ between a direction of the terminal device relative to the network device and a dome direction, and the horizontal direction angle represents an included angle φ between a direction of the terminal device relative to the network device and a due north direction in a horizontal plane. With reference to the included angles described in FIG. 6, the included angles shown in FIG. 6 are positive counterclockwise and negative clockwise.

For the DAOD, the vertical direction angle indicates an included angle θ between an electromagnetic wave departure direction observed from the network device and a dome direction during downlink electromagnetic wave transmission between the network device and the terminal device. The horizontal direction angle indicates an included angle φ of an electromagnetic wave departure direction observed from the network device relative to a due north direction in a horizontal plane during downlink electromagnetic wave transmission between the network device and the terminal device.

For the UAOA, the vertical direction angle indicates an included angle θ between an electromagnetic wave arrival direction observed from the network device and a dome direction during uplink electromagnetic wave transmission between the network device and the terminal device. The horizontal direction angle indicates an included angle φ of an electromagnetic wave arrival direction observed from the network device relative to a due north direction in a horizontal plane during uplink electromagnetic wave transmission between the network device and the terminal device.

The embodiments described in this specification may be independent solutions, or may be combined based on internal logic. These solutions all fall within the protection scope of this application.

It may be understood that, in the foregoing method embodiments, the methods and the operations implemented by the terminal device may also be implemented by a component (for example, a chip or a circuit) that may be used in the terminal device, and the methods and the operations implemented by the location management device may also be implemented by a component (for example, a chip or a circuit) that may be used in the location management device.

The foregoing describes the method embodiments provided in the embodiments of this application, and the following describes apparatus embodiments provided in the embodiments of this application. It should be understood that descriptions of the apparatus embodiments mutually correspond to the descriptions of the method embodiments. Therefore, for content that is not described in detail, refer to the foregoing method embodiments. For brevity, details are not described herein again.

The foregoing mainly describes, in terms of interaction between various devices, the solutions provided in the embodiments of this application. It may be understood that, to implement the foregoing functions, each device, such as a transmit end device or a receive end device, includes a corresponding hardware structure and/or software module for performing each function. A person skilled in the art may be aware that, with reference to the examples described in the embodiments disclosed in this specification, units and algorithm steps may be implemented by hardware or a combination of computer software and hardware. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the transmit end device or the receive end device may be divided into functional modules based on the foregoing method examples. For example, each functional module may be obtained through division based on a corresponding function, or two or more functions may be integrated into one processing module. The foregoing integrated module may be implemented in a form of hardware, or may be implemented in a form of a software functional module. It should be noted that, in the embodiments of this application, division into the modules is an example, and is merely logical function division. In actual implementation, another division manner may be used. An example in which each functional module is obtained through division based on the corresponding function is used below for description.

Figure 7:
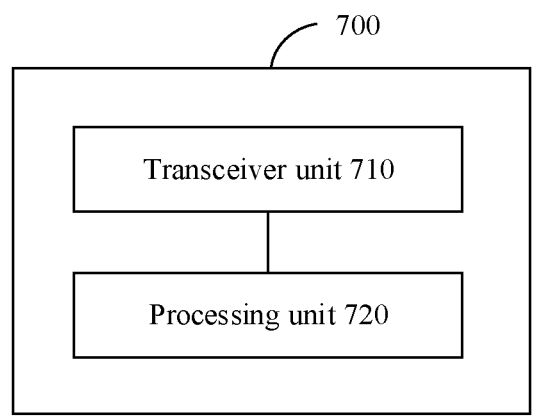
FIG. 7 is a schematic block diagram of a communication device according to an embodiment of this application.

FIG. 7 is a schematic block diagram of a communication device 700 according to an embodiment of this application. The communication device 700 includes a transceiver unit 710 and a processing unit 720. The transceiver unit 710 may communicate with the outside, and the processing unit 720 is configured to process data. The transceiver unit 710 may also be referred to as a communication interface or a communication unit.

The communication device 700 may be configured to perform an action performed by the terminal device in the foregoing method embodiments, or the communication device 700 may be configured to perform an action performed by the location management device in the foregoing method embodiments.

In an implementation, the communication device 700 may be configured to perform the action performed by the location management device in the foregoing method embodiments.

In the implementation, the communication device 700 may be referred to as a location management device. The transceiver unit 710 is configured to perform a receiving/sending-related operation on a location management device in the foregoing method embodiments, and the processing unit 720 is configured to perform a processing-related operation of the location management device in the foregoing method embodiments.

The transceiver unit 710 is configured to: provide assistance information for a terminal device, where the assistance information includes information about one or more cells used for positioning of the terminal device and reference signal configuration information of each of the one or more cells; provide a first request message to the terminal device, where the first request message includes measurement reporting configuration information; and receive, from the terminal device, a reference signal measurement result of each of the one or more cells, where the reference signal measurement result is obtained based on the measurement reporting configuration information.

The processing unit 720 is configured to obtain, based on the reference signal measurement result, a downlink angle of departure (DAOD) of the terminal device relative to each of the one or more cells.

In this application, the location management device interacts with the terminal device to implement reference signal configuration and measurement reporting configuration that are used for DAOD positioning. Therefore, in this application, a cell used for positioning of the terminal device is not limited to an intra-frequency cell, that is, inter-frequency positioning may be supported. In addition, when the cell used for positioning of the terminal device is a neighboring cell, a reference signal cannot be an SSB for the neighboring cell in an existing configuration framework. This is not limited in this application. Therefore, compared with a conventional technology, this application provides a solution for configuring the reference signal configuration information and the measurement reporting configuration information that are relatively suitable for DAOD positioning.

The reference signal configuration information includes any one or more of the following information of a reference signal: time domain resource information, frequency domain resource information, and sequence information.

The reference signal includes any one of the following: a channel state information reference signal (CSI-RS), a positioning reference signal (PRS), or a synchronization signal block (SSB).

Optionally, in some embodiments, the reference signal configuration information includes baseline resource configuration information used by the terminal device to perform path power measurement.

Optionally, in some embodiments, the measurement reporting configuration information includes any one or more of the following: a quantity of to-be-reported reference signal received powers (RSRPs), whether a path power needs to be reported; and a quantity of powers to be reported in each path when the path power needs to be reported.

Optionally, in some embodiments, the reference signal measurement result includes the reference signal received power (RSRP) and/or the path power.

Optionally, in some embodiments, the transceiver unit 710 is further configured to receive capability information of the terminal device from the terminal device. The processing unit 720 is further configured to determine the reference signal configuration information and the measurement reporting configuration information based on the capability information of the terminal device, where the capability information of the terminal device includes any one or more of the following: a quantity of receive beams, a quantity of receive antenna panels, whether path power reporting is supported, and a quantity of paths whose powers can be reported when path power reporting is supported.

Optionally, in some embodiments, the transceiver unit 710 is further configured to receive a second request message from the terminal device, where the second request message includes information about a special cell in which the terminal device is located. The processing unit 720 is further configured to determine, based on the information about the special cell, the one or more cells used for positioning of the terminal device.

Optionally, in some embodiments, the second request message further includes a result of measurement performed by the terminal device on a historical downlink reference signal in at least one cell, and some or all of the at least one cell is the same as the one or more cells used for positioning of the terminal device. The processing unit 720 is configured to determine the reference signal configuration information based on the measurement result.

Optionally, in some embodiments, the result of measurement performed by the terminal device on the historical downlink reference signal in the at least one cell includes any one or more of the following: a reference signal received power (RSRP) measured by the terminal device based on serving cell channel state information (CSI) obtaining/beam management framework configuration; an RSRP measured by the terminal device based on serving cell mobility management configuration; and an RSRP of a reference signal for another purpose measured by the terminal device based on configuration of the location management device.

In another implementation, the communication device 700 may be configured to perform the action performed by the terminal device in the foregoing method embodiments.

In the implementation, the communication device 700 may be referred to as a terminal device. The transceiver unit 710 is configured to perform a receiving/sending-related operation on a terminal device in the foregoing method embodiments, and the processing unit 720 is configured to perform a processing-related operation of the terminal device in the foregoing method embodiments.

The transceiver unit 710 is configured to:
receive assistance information from a location management device, where the assistance information includes information about one or more cells used for downlink angle of departure (DAOD) positioning of the terminal device and reference signal configuration information of each of the one or more cells;
receive a first request message from the location management device, where the first request message includes measurement reporting configuration information; and
receive a reference signal from the one or more cells based on the reference signal configuration information.

The processing unit 720 is configured to measure the received reference signal based on the measurement reporting configuration information, to obtain a reference signal measurement result of the one or more cells.

The transceiver unit 710 is further configured to send a positioning message to the location management device, where the positioning message includes the reference signal measurement result of the one or more cells.

In this application, the location management device interacts with the terminal device to implement reference signal configuration and measurement reporting configuration that are used for DAOD positioning. Therefore, in this application, a cell used for positioning of the terminal device is not limited to an intra-frequency cell, that is, inter-frequency positioning may be supported. In addition, when the cell used for positioning of the terminal device is a neighboring cell, a reference signal cannot be an SSB for the neighboring cell in an existing configuration framework. This is not limited in this application. Therefore, compared with a conventional technology, this application provides a solution for configuring the reference signal configuration information and the measurement reporting configuration information that are relatively suitable for DAOD positioning.

The reference signal configuration information includes any one or more of the following information of a reference signal: time domain resource information, frequency domain resource information, and sequence information.

The reference signal includes any one of the following: a channel state information reference signal (CSI-RS), a positioning reference signal (PRS), or a synchronization signal block (SSB).

Optionally, in some embodiments, the reference signal configuration information includes baseline resource configuration information used by the terminal device to perform path power measurement.

Optionally, in some embodiments, the measurement reporting configuration information includes any one or more of the following: a quantity of to-be-reported reference signal received powers (RSRPs), whether a path power needs to be reported; and a quantity of powers to be reported in each path when the path power needs to be reported.

Optionally, in some embodiments, the reference signal measurement result includes the reference signal received power (RSRP) and/or the path power.

Optionally, in some embodiments, the transceiver unit 710 is further configured to send capability information of the terminal device to the location management device, where the capability information of the terminal device includes any one or more of the following: a quantity of receive beams, a quantity of receive antenna panels, whether path power reporting is supported, and a quantity of paths whose powers can be reported when path power reporting is supported.

Optionally, in some embodiments, the transceiver unit 710 is further configured to send a second request message to the location management device, where the second request message includes information about a special cell in which the terminal device is located.

Optionally, in some embodiments, the second request message further includes a result of measurement performed by the terminal device on a historical downlink reference signal in at least one cell, and some or all of the at least one cell is the same as the one or more cells used for positioning of the terminal device.

Optionally, in some embodiments, the result of measurement performed by the terminal device on the historical downlink reference signal in the at least one cell includes any one or more of the following: a reference signal received power (RSRP) measured by the terminal device based on serving cell channel state information (CSI) obtaining/beam management framework configuration; an RSRP measured by the terminal device based on serving cell mobility management configuration; and an RSRP of a reference signal for another purpose measured by the terminal device based on configuration of the location management device.

It should be understood that the processing unit 720 in the foregoing embodiment may be implemented by a processor or a processor-related circuit, and the transceiver unit 710 may be implemented by a transceiver or a transceiver-related circuit.

Figure 8:
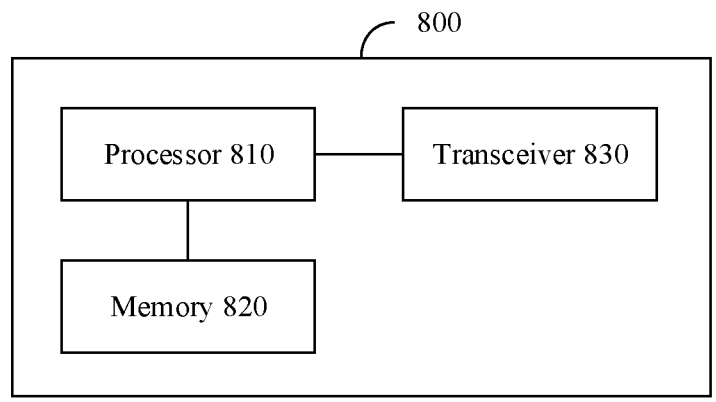
FIG. 8 is another schematic block diagram of a communication device according to an embodiment of this application.

As shown in FIG. 8, an embodiment of this application further provides a communication device 800. The communication device 800 includes a processor 810, a memory 820, and a transceiver 830. The memory 820 stores a program. The processor 810 is configured to execute the program stored in the memory 820. Execution of the program stored in the memory 820 enables the processor 810 to perform related processing steps in the foregoing method embodiments, and enables the processor 810 to control the transceiver 830 to perform receiving/sending-related steps in the foregoing method embodiments.

In an implementation, the communication device 800 is configured to perform the action performed by the terminal device in the foregoing method embodiments. In this case, the execution of the program stored in the memory 820 enables the processor 810 to perform the processing steps on the terminal device in the foregoing method embodiments, and enables the processor 810 to control the transceiver 830 to perform the receiving and sending steps on the terminal device in the foregoing method embodiments.

In another implementation, the communication device 800 is configured to perform the action performed by the location management device in the foregoing method embodiments. In this case, the execution of the program stored in the memory 820 enables the processor 810 to perform the processing steps on a location management device in the foregoing method embodiments, and enables the processor 810 to control the transceiver 830 to perform the receiving and sending steps on the location management device in the foregoing method embodiments.

An embodiment of this application further provides a communication device 900. The communication device 900 may be a terminal device or a chip. The communication device 900 may be configured to perform the action performed by the terminal device in the foregoing method embodiments.

Figure 9:
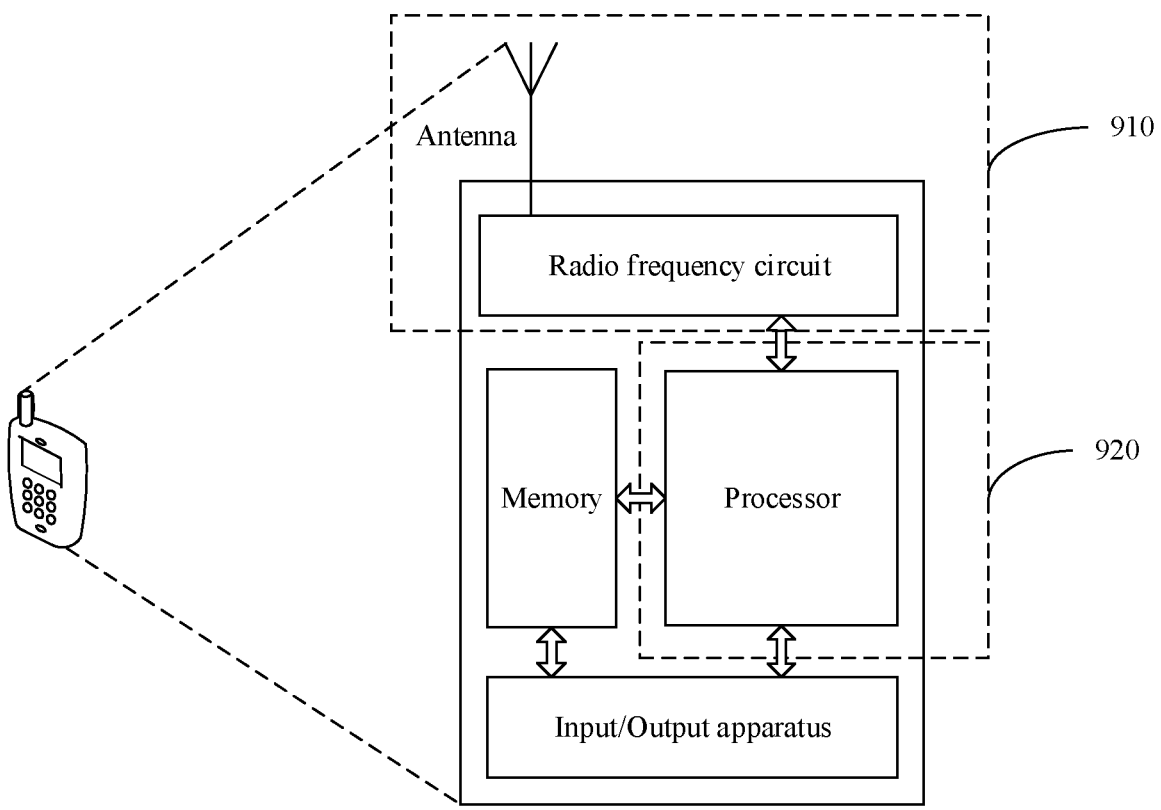
FIG. 9 is a schematic block diagram of a terminal device according to an embodiment of this application.

When the communication device 900 is a terminal device, FIG. 9 is a simplified schematic structural diagram of the terminal device. For ease of understanding and convenience of figure illustration, an example in which the terminal device is a mobile phone is used in FIG. 9. As shown in FIG. 9, the terminal device includes a processor, a memory, a radio frequency circuit, an antenna, and an input/output apparatus. The processor is mainly configured to: process a communication protocol and communication data, control the terminal device, execute a software program, process data of the software program, and so on. The memory is mainly configured to store the software program and the data. The radio frequency circuit is mainly configured to: perform conversion between a baseband signal and a radio frequency signal, and process the radio frequency signal. The antenna is mainly configured to receive and transmit a radio frequency signal in an electromagnetic wave form. The input/output apparatus such as a touchscreen, a display, or a keyboard is mainly configured to receive data entered by a user and output data to the user. It should be noted that terminal devices of some types may have no input/output apparatus.

When data needs to be sent, after performing baseband processing on the to-be-sent data, the processor outputs a baseband signal to the radio frequency circuit, and the radio frequency circuit performs radio frequency processing on the baseband signal and then sends a radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 9 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in the embodiments of this application.

In the embodiments of this application, the antenna and the radio frequency circuit that have receiving and sending functions may be considered as a transceiver unit of the terminal device, and the processor that has a processing function may be considered as a processing unit of the terminal device.

As shown in FIG. 9, the terminal device includes a transceiver unit 910 and a processing unit 920. The transceiver unit 910 may also be referred to as a transceiver, a transceiver machine, a transceiver apparatus, or the like. The processing unit 920 may also be referred to as a processor, a processing board, a processing module, a processing apparatus, or the like. Optionally, a component that is in the transceiver unit 910 and that is configured to implement a receiving function may be considered as a receiving unit, and a component that is in the transceiver unit 910 and that is configured to implement a sending function may be considered as a sending unit. That is, the transceiver unit 910 includes the receiving unit and the sending unit. The transceiver unit may also be sometimes referred to as a transceiver machine, a transceiver, a transceiver circuit, or the like. The receiving unit may also be sometimes referred to as a receiver machine, a receiver, a receiver circuit, or the like. The sending unit may also be sometimes referred to as a transmitter machine, a transmitter, a transmitter circuit, or the like.

For example, in an implementation, the transceiver unit 910 is further configured to perform a receiving operation on the terminal device in step S510, step S540, step S550, and step S560 shown in FIG. 5, and is further configured to perform a sending operation on the terminal device in step S520, step S530, step S560, and step S570 shown in FIG. 5, and/or the transceiver unit 910 is further configured to perform another receiving and sending steps on the terminal device. The processing unit 920 is configured to perform the processing step on the terminal device in step S560 shown in FIG. 5, for example, measure a received reference signal based on the measurement reporting configuration information received in step S560, to obtain a reference signal measurement result.

It should be understood that FIG. 9 is merely an example instead of a limitation. The terminal device including the transceiver unit and the processing unit may not depend on the structure shown in FIG. 9.

When the communication device 900 is a chip, the chip includes a transceiver unit and a processing unit. The transceiver unit may be an input/output circuit or a communication interface. The processing unit may be a processor, a microprocessor, or an integrated circuit integrated on the chip.

An embodiment of this application further provides a communication system. The communication system includes the location management device, the cell, and the terminal device in the foregoing embodiments.

An embodiment of this application further provides a computer-readable storage medium. The computer-readable storage medium stores a computer program. When the computer program is executed by a computer, the computer is enabled to implement the method on a terminal device or the method on a location management device in the foregoing method embodiments.

An embodiment of this application further provides a computer program product including instructions. When the instructions are executed by a computer, the computer is enabled to implement the method on a terminal device or the method on a location management device in the foregoing method embodiments.

For explanations and beneficial effects of related content of any of the communication apparatuses provided above, refer to the corresponding method embodiment provided above, and details are not described herein again.

In the embodiments of this application, the terminal device or the network device includes a hardware layer, an operating system layer running on the hardware layer, and an application layer running on the operating system layer. The hardware layer includes hardware such as a central processing unit (central processing unit, CPU), a memory management unit (memory management unit, MMU), and a memory (which is also referred to as a main memory). The operating system may be any one or more of computer operating systems, for example, a Linux operating system, a Unix operating system, an Android operating system, an iOS operating system, or a Windows operating system, that implement service processing by using a process (process). The application layer includes applications such as a browser, an address book, word processing software, and instant communication software. In addition, a specific structure of an execution body of a method provided in the embodiments of this application is not specifically limited in the embodiments of this application provided that a program that records code for the method provided in the embodiments of this application can be run to perform communication according to the method provided in the embodiments of this application. For example, the execution body of the method provided in the embodiments of this application may be the terminal device, the network device, or a functional module that is in the terminal device or the network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (compact disc, CD) or a digital versatile disc (digital versatile disc, DVD)), a smart card, and a flash memory component (for example, an erasable programmable read-only memory (erasable programmable read-only memory, EPROM), a card, a stick, or a key drive). In addition, various storage media described in this specification may indicate one or more devices and/or other machine-readable media that are configured to store information. The term "machine-readable media" may include but is not limited to a radio channel and various other media that can store, include, and/or carry instructions and/or data.

It should be understood that, the processor mentioned in the embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It may be understood that the memory mentioned in this embodiment of this application may be a volatile memory or a nonvolatile memory, or may include a volatile memory and a nonvolatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. Through example but not limitative descriptions, many forms of RAMs may be used, for example, a static random access memory (Static RAM, SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logic device, a discrete gate or transistor logic device, or a discrete hardware component, the memory (storage module) is integrated into the processor.

It should be noted that the memory described in this specification aims to include but is not limited to these memories and any memory of another proper type.

A person of ordinary skill in the art may be aware that, with reference to the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed systems, apparatuses, and methods may be implemented in other manners. For example, the described apparatus embodiments are merely examples. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, in other words, may be located in one position, or may be distributed on a plurality of network units. Some or all of the units may be selected based on an actual requirement to achieve the objective of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to a conventional technology, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions describe merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method performed by a location management device or a chip of a location management device, the method comprising:
sending to a terminal device a request message requesting capability information of the terminal device;
receiving capability information of the terminal device from the terminal device; and
determining reference signal configuration information and measurement reporting configuration information based on the capability information of the terminal device, wherein the capability information of the terminal device comprises at least one of the following:
a quantity of receive beams;
a quantity of receive antenna panels;
whether path power reporting is supported; and
a quantity of paths whose powers can be reported when path power reporting is supported;
providing assistance information for the terminal device, the assistance information comprising information about one or more cells for determining position of the terminal device and the reference signal configuration information of each of the one or more cells, the reference signal configuration information including at least one of time domain resource information, frequency domain resource information or sequence information;

providing a first request message for the terminal device, the first request message comprising the measurement reporting configuration information, the measurement reporting configuration information including a report of a power metric;

receiving, from the terminal device, a reference signal measurement result of each of the one or more cells, the reference signal measurement result being obtained based on the measurement reporting configuration information; and determining, based on the reference signal measurement result, a downlink angle of departure (DAOD) of the terminal device relative to each of the one or more cells.

2. The method according to claim 1, wherein the reference signal comprises any one of the following: a channel state information reference signal (CSI-RS), a positioning reference signal (PRS), or a synchronization signal block (SSB).

3. The method according to claim 1, wherein the reference signal configuration information comprises baseline resource configuration information used by the terminal device for path power measurement.

4. The method according to claim 1, wherein the measurement reporting configuration information comprises at least one of the following:
- a quantity of to-be-reported reference signal received powers (RSRPs);
- whether a path power needs to be reported; and
- a quantity of powers to be reported in a path when the path power needs to be reported.

5. The method according to claim 1, wherein the reference signal measurement result comprises at least one of reference signal received power (RSRP) and path power.

6. A positioning method performed by a terminal device or a chip of a terminal device, comprising:
receiving a request message requesting capability information of the terminal device from a location management device;
sending capability information of the terminal device to the location management device, wherein the capability information of the terminal device comprises at least one of the following: a quantity of receive beams, a quantity of receive antenna panels, whether path power reporting is supported, and a quantity of powers can be reported in a path when path power reporting is supported;
receiving assistance information from the location management device, the assistance information comprising information about one or more cells for determining position of the terminal device and reference signal configuration information of each of the one or more cells, the reference signal configuration information including at least one of time domain resource information, frequency domain resource information or sequence information;
receiving a first request message from the location management device, wherein the first request message comprises measurement reporting configuration information, the measurement reporting configuration information including a report of a power metric;
receiving a reference signal from the one or more cells based on the reference signal configuration information;
measuring the received reference signal based on the measurement reporting configuration information to obtain a reference signal measurement result of the one or more cells; and
sending a positioning message to the location management device, wherein the positioning message comprises the reference signal measurement result of the one or more cells.

7. The method according to claim 6, wherein the reference signal comprises any one of the following: a channel state information reference signal (CSI-RS), a positioning reference signal (PRS), or a synchronization signal block (SSB).

8. The method according to claim 6, wherein the reference signal configuration information comprises baseline resource configuration information used by the terminal device for path power measurement.

9. The method according to claim 6, wherein the measurement reporting configuration information comprises at least one of the following:
- a quantity of to-be-reported reference signal received powers (RSRPs);
- whether a path power needs to be reported; and
- a quantity of powers to be reported in a path when the path power needs to be reported.

10. The method according to claim 6, wherein the reference signal measurement result comprises at least one of reference signal received power (RSRP) and path power.

11. An apparatus, comprising:
at least one processor; and
a memory coupled to the at least one processor and storing program instructions that, when executed by the at least one processor, cause the apparatus to perform the following steps:
sending to a terminal device a request message requesting capability information of the terminal device;
receiving capability information of the terminal device from the terminal device; and
determining reference signal configuration information and measurement reporting configuration information based on the capability information of the terminal device, wherein the capability information of the terminal device comprises at least one of the following:
a quantity of receive beams;
a quantity of receive antenna panels;
whether path power reporting is supported; and
a quantity of paths whose powers can be reported when path power reporting is supported;
providing assistance information for the terminal device, the assistance information comprising information about one or more cells for determining position of the terminal device and the reference signal configuration information of each of the one or more cells, the reference signal configuration information including at least one of time domain resource information, frequency domain resource information or sequence information;
providing a first request message for the terminal device, the first request message comprising the measurement reporting configuration information, the measurement reporting configuration information including a report of a power metric;
receiving, from the terminal device, a reference signal measurement result of each of the one or more cells, the reference signal measurement result being obtained based on the measurement reporting configuration information;

determining, based on the reference signal measurement result, a downlink angle of departure (DAOD) of the terminal device relative to each of the one or more cells.

12. The apparatus according to claim 11, wherein the reference signal comprises any one of the following: a channel state information reference signal (CSI-RS), a positioning reference signal (PRS), or a synchronization signal block (SSB).

13. The apparatus according to claim 11, wherein the reference signal configuration information comprises baseline resource configuration information used by the terminal device for path power measurement.

14. The apparatus according to claim 11, wherein the measurement reporting configuration information comprises at least one of the following:
- a quantity of to-be-reported reference signal received powers (RSRPs);
- whether a path power needs to be reported; and
- a quantity of powers to be reported in a path when the path power needs to be reported.

15. The apparatus according to claim 11, wherein the reference signal measurement result comprises at least one of reference signal received power (RSRP) and path power.

16. An apparatus, comprising:
at least one processor; and
a memory coupled to the at least one processor and storing program instructions that, when executed by the at least one processor, cause the apparatus to perform the following steps:
receiving a request message requesting capability information of a terminal device from a location management device;
sending capability information of the terminal device to the location management device, wherein the capability information of the terminal device comprises at least one of the following: a quantity of receive beams, a quantity of receive antenna panels, whether path power reporting is supported, and a quantity of powers can be reported in a path when path power reporting is supported;
receiving assistance information from the location management device, the assistance information comprising information about one or more cells for determining position of the terminal device and reference signal configuration information of each of the one or more cells, the reference signal configuration information including at least one of time domain resource information, frequency domain resource information or sequence information;
receiving a first request message from the location management device, wherein the first request message comprises measurement reporting configuration information, the measurement reporting configuration information including a report of a power metric;
receiving a reference signal from the one or more cells based on the reference signal configuration information;
measuring the received reference signal based on the measurement reporting configuration information to obtain a reference signal measurement result of the one or more cells; and
sending a positioning message to the location management device, wherein the positioning message comprises the reference signal measurement result of the one or more cells.

17. The apparatus according to claim 16, wherein the reference signal comprises any one of the following: a channel state information reference signal (CSI-RS), a positioning reference signal (PRS), or a synchronization signal block (SSB).

18. The apparatus according to claim 16, wherein the measurement reporting configuration information comprises at least one of the following:
- a quantity of to-be-reported reference signal received powers (RSRPs);
- whether a path power needs to be reported; and
- a quantity of powers to be reported in a path when the path power needs to be reported.

19. The apparatus according to claim 16, wherein the reference signal measurement result comprises at least one of reference signal received power (RSRP) and path power.

20. The apparatus according to claim 16, wherein the apparatus is the terminal device or a chip of the terminal device.

* * * * *